US012576546B2

(12) United States Patent (10) Patent No.: US 12,576,546 B2
Suto et al. (45) Date of Patent: Mar. 17, 2026

(54) CUTTING DEVICE

(71) Applicant: Max Co., Ltd., Tokyo (JP)

(72) Inventors: Kohei Suto, Tokyo (JP); Takashi Morimura, Tokyo (JP); Kazunobu Yoshimura, Tokyo (JP); Shoma Sano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 155 days.

(21) Appl. No.: 18/397,796

(22) Filed: Dec. 27, 2023

(65) Prior Publication Data

US 2024/0207956 A1    Jun. 27, 2024

(30) Foreign Application Priority Data

| Dec. 27, 2022 | (JP) | ................................ | 2022-210196 |
| Dec. 27, 2022 | (JP) | ................................ | 2022-210296 |
| Dec. 27, 2022 | (JP) | ................................ | 2022-210302 |
| Dec. 27, 2022 | (JP) | ................................ | 2022-210308 |
| Dec. 27, 2022 | (JP) | ................................ | 2022-210362 |
| Dec. 27, 2022 | (JP) | ................................ | 2022-210372 |
| Dec. 27, 2022 | (JP) | ................................ | 2022-210594 |
| Dec. 27, 2022 | (JP) | ................................ | 2022-210638 |

(51) Int. Cl.
| *B23D 36/00* | (2006.01) |
| *B23D 29/00* | (2006.01) |
| *B23D 33/02* | (2006.01) |
| *B26B 15/00* | (2006.01) |
| *B26B 29/04* | (2006.01) |
| *B26B 29/06* | (2006.01) |

(52) U.S. Cl.
CPC ........... *B23D 33/02* (2013.01); *B23D 29/002* (2013.01); *B26B 15/00* (2013.01); *B26B 29/04* (2013.01); *B26B 29/06* (2013.01)

(58) Field of Classification Search
CPC .. B23D 33/02; B23D 29/002; B23D 36/0008; B26B 15/00; B26B 29/04; B26B 29/06
See application file for complete search history.

(56) References Cited

U.S. PATENT DOCUMENTS

| 4,369,576 A * | 1/1983 | McVaugh | ............. | B23D 29/002 |
| | | | | 92/111 |
| 12,202,155 B2 * | 1/2025 | Shu | ......................... | B26B 13/04 |
| 2013/0055575 A1 * | 3/2013 | Delmas | ................... | B26B 15/00 |
| | | | | 318/647 |
| 2018/0161889 A1 * | 6/2018 | Barezzani | .............. | H02G 1/005 |

(Continued)

FOREIGN PATENT DOCUMENTS

| EP | 3466578 A1 | 4/2019 |
| JP | 2021-040594 A | 3/2021 |

OTHER PUBLICATIONS

May 6, 2024—(EP) Extended EP Search Report—EP App 23220271.3.

*Primary Examiner* — Omar Flores Sanchez
(74) *Attorney, Agent, or Firm* — Banner & Witcoff, Ltd.

(57) ABSTRACT

An electric cutting device includes a pair of cutting blades configured to clamp and cut an object, an electric motor configured to generate a driving force necessary for operating the cutting blades, a controller configured to control an operation of the electric motor, and a speed detector configured to detect a speed index, the speed index indicating an operation speed of the cutting blades. The controller is configured to brake the cutting blades based on the speed index.

14 Claims, 11 Drawing Sheets

(56) References Cited

U.S. PATENT DOCUMENTS

| 2021/0339410 | A1 | | 11/2021 | Hayashi et al. |
| 2022/0287243 | A1 | * | 9/2022 | Lindén ................. A01G 3/0255 |
| 2022/0312680 | A1 | | 10/2022 | Nii |

* cited by examiner

*FIG. 3*

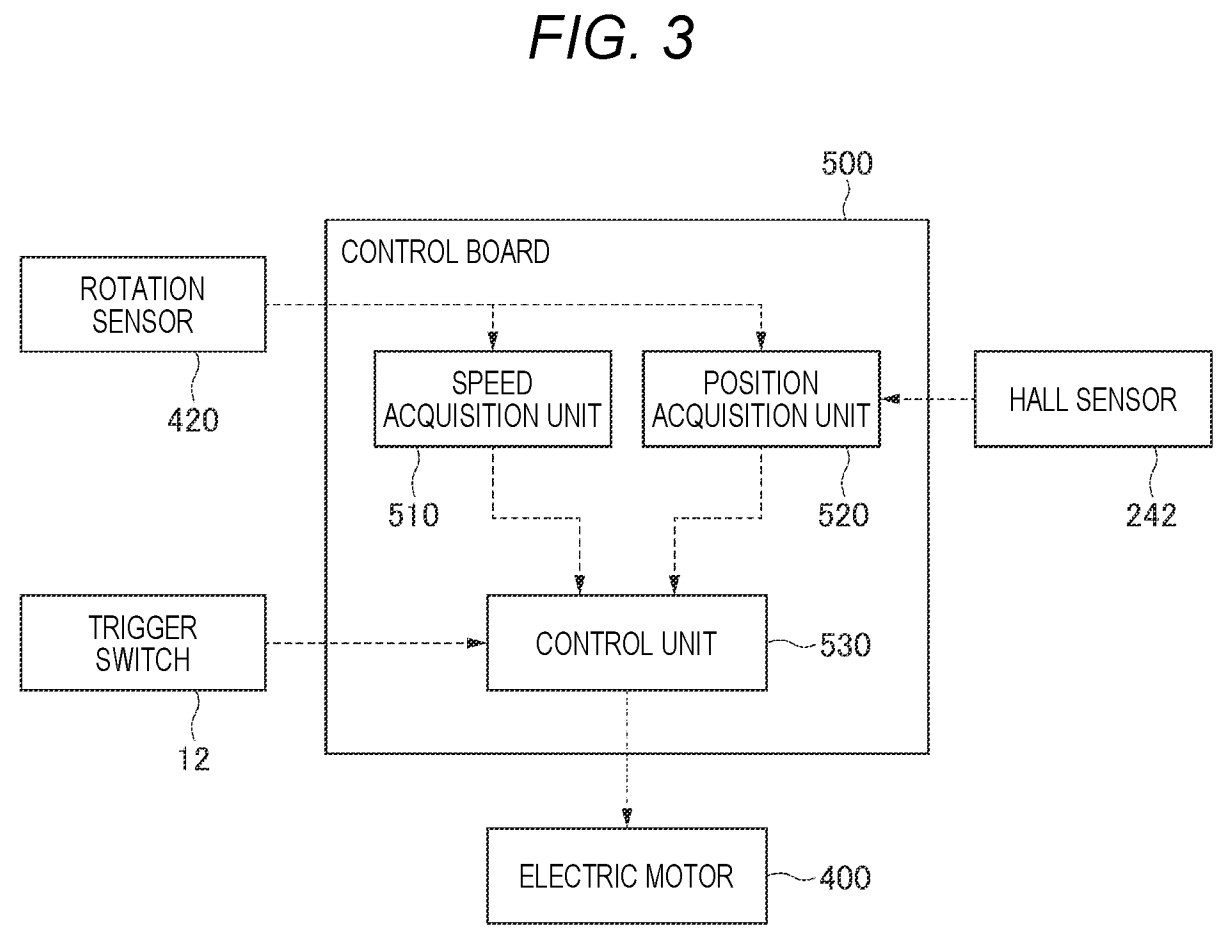

HALL SENSOR
242

CONTROL BOARD
500

POSITION
ACQUISITION UNIT
520

SPEED
ACQUISITION UNIT
510

CONTROL UNIT
530

ELECTRIC MOTOR
400

ROTATION
SENSOR
420

TRIGGER
SWITCH
12

CUTTING DEVICE

CROSS-REFERENCE TO RELATED APPLICATIONS

The present application claims priority from Japanese Patent Application No. 2022-210196 filed on Dec. 27, 2022, Japanese Patent Application No. 2022-210296 filed on Dec. 27, 2022, Japanese Patent Application No. 2022-210302 filed on Dec. 27, 2022, Japanese Patent Application No. 2022-210308 filed on Dec. 27, 2022, Japanese Patent Application No. 2022-210362 filed on Dec. 27, 2022, Japanese Patent Application No. 2022-210372 filed on Dec. 27, 2022, Japanese Patent Application No. 2022-210594 filed on Dec. 27, 2022, and Japanese Patent Application No. 2022-210638 filed on Dec. 27, 2022, the entire contents of which are incorporated herein by reference.

TECHNICAL FIELD

The present disclosure relates to an electric cutting device.

BACKGROUND ART

As an electric cutting device, an electric pruning shear and the like as described in JP2021-40594A are known, for example. In an electric cutting device, cutting blades are operated by a driving force of an electric motor instead of a gripping force of a user, and cut an object to be cut by clamping the object with the pair of cutting blades. The above electric pruning shear is one in which a tree branch is set as an object to be cut, but a cutting device in which metal such as a reinforcing bar is set as the object to be cut is also known.

SUMMARY

When operating a cutting blade in an electric cutting device, it is preferable to stop the cutting blade at a predetermined target position after cutting is completed. For example, instead of a pruning shear in which a pair of cutting blades operate while passing each other, in a cutting device in which a pair of cutting blades operate in opposition to each other (that is, the pair of cutting blades operate on trajectories that pass through substantially the same plane), if a timing when the cutting blades are stopped is delayed, the respective cutting blades collide with each other at a high relative speed, and a situation may occur in which a part of the cutting blades is deformed or damaged.

However, an operation speed of the cutting blade during cutting is not always constant and changes depending on a material, a shape, and the like of an object to be cut. Therefore, even if the operation of the cutting blades is always controlled under the same condition, the cutting blades may not be always stopped at the same position. In order to prevent the cutting blades from colliding with each other, it is conceivable to operate the cutting blades at a low speed, but in that case, problems such as a cutting operation taking too much time may arise. In the related art, there is no specific study on how to brake cutting blades in an electric cutting device.

Illustrative aspects of the present disclosure provide an electric cutting device that stops a cutting blade at an appropriate position.

One illustrative aspect of the present disclosure provides an electric cutting device including: a pair of cutting blades configured to clamp and cut an object; an electric motor configured to generate a driving force necessary for operating the cutting blades; a controller configured to control an operation of the electric motor; and a speed detector configured to detect a speed index, the speed index indicating an operation speed of the cutting blades. The controller is configured to brake the cutting blades based on the speed index.

A distance that the cutting blades move during a period from the start to the end of braking, that is, a braking distance, has a correlation with the operation speed of the cutting blades before the start of braking. Therefore, in the cutting device having the above configuration, the cutting blades are braked based on the speed index which is an index indicating the operation speed of the cutting blades. Accordingly, even if the braking distance varies depending on a situation, it is possible to stop the cutting blades at an appropriate position.

According to the present disclosure, an electric cutting device that can stop a cutting blade at an appropriate position is provided.

BRIEF DESCRIPTION OF DRAWINGS

FIG. 3 is a diagram showing a configuration of a control board included in the cutting device according to the first illustrative embodiment;

FIG. 7 is a diagram illustrating an operation of cutting blades during braking;

FIG. 11 is a diagram illustrating an operation of cutting blades during braking.

DESCRIPTION OF EMBODIMENTS

Figure 1:
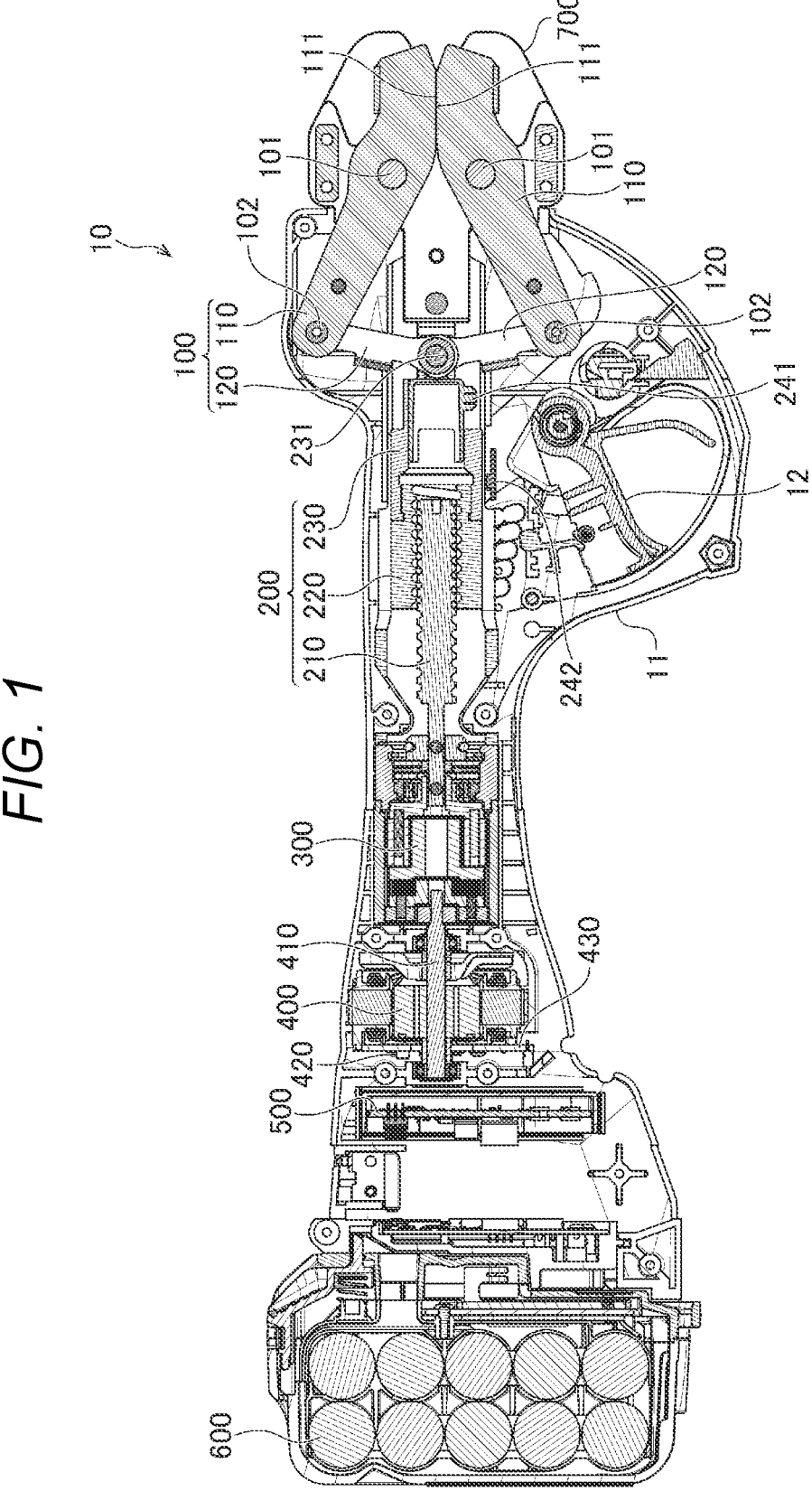
FIG. 1 is a diagram showing a configuration of a cutting device according to a first illustrative embodiment.

The present illustrative embodiment will be described below with reference to the accompanying drawings. In order to facilitate understanding of the description, the same components are denoted by the same reference numerals as much as possible in the drawings, and redundant descriptions will be omitted.

A first illustrative embodiment will be described. A cutting device 10 according to the present illustrative embodiment is an electric cutting device, and is configured as a device for cutting a reinforcing bar at a construction site or the like. A configuration of the cutting device 10 will be described mainly with reference to FIG. 1. The cutting device 10 includes a housing 11, a trigger switch 12, a cutting mechanism 100, a ball screw 200, a speed reducer 300, an electric motor 400, a control board 500, and a storage battery 600.

The housing 11 is a container that defines an outer shape of the cutting device 10, and is made of resin, for example. The ball screw 200 described later, the speed reducer 300 described later, and the like are housed inside the housing 11. In FIG. 1, a portion of the housing 11 on a front side when viewed on paper is removed, and an internal configuration of the cutting device 10 is shown as a cross-sectional view.

The trigger switch 12 is a switch operated by a finger of a user. The user can turn on the trigger switch 12 by placing his or her finger on the trigger switch 12 and pulling the trigger switch 12 to the front side. When the user loosens his or her finger, the trigger switch 12 returns to an original position due to a force of a spring, and is turned off. When the trigger switch 12 is switched between the on state and the off state, a corresponding signal is transmitted to the control board 500 which will be described later. As will be described later, when the trigger switch 12 is turned on by an operation of the user, an operation for cutting a reinforcing bar is started.

The cutting mechanism 100 is a portion that cuts the reinforcing bar which is an object to be cut. The cutting mechanism 100 includes a pair of blade members 110 and a pair of link members 120.

Cutting blades 111 that clamp and cut the object to be cut are formed on the respective blade members 110. The blade member 110 is held pivotably around a shaft 101 fixed to the housing 11. In the present illustrative embodiment, the respective blade members 110 are arranged to face each other such that ridge lines of blade edges of the cutting blades 111 operate on trajectories passing through substantially the same plane. Accordingly, it is possible to switch between an opened state in which the respective cutting blades 111 are spaced apart from each other and a closed state in which the respective cutting blades 111 are in contact with (or close to) each other. In the example of FIG. 1, the pair of cutting blades 111 are in the closed state.

Each link member 120 is a rod-shaped member, and one end is connected to the blade member 110 via a shaft 102, and the other end is connected to a connection member 230 described later via a shaft 231. The link member 120 and the blade member 110 are connected to each other in a manner of pivoting about the shaft 102. Similarly, the link member 120 and the connection member 230 are connected to each other in a manner of pivoting about the shaft 231. As will be described later, the connection member 230 moves in a left-right direction in FIG. 1 by a driving force of the electric motor 400.

If the connection member 230 moves in the left direction from the state shown in FIG. 1, the blade member 110 on an upper side of FIG. 1 pivots counterclockwise, and the blade member 110 on a lower side of FIG. 1 pivots clockwise. Accordingly, the pair of cutting blades 111 change from the closed state to the opened state. On the other hand, when the pair of cutting blades 111 are in the opened state, if connection member 230 moves in the right direction in FIG. 1, the blade member 110 on the upper side of FIG. 1 pivots clockwise, and the blade member 110 on the lower side of FIG. 1 pivots counterclockwise. Accordingly, the pair of cutting blades 111 return to the closed state. Accordingly, the pair of blade members 110, the pair of link members 120, and the connection member 230 as a whole constitute a so-called "toggle link mechanism".

Figure 2:
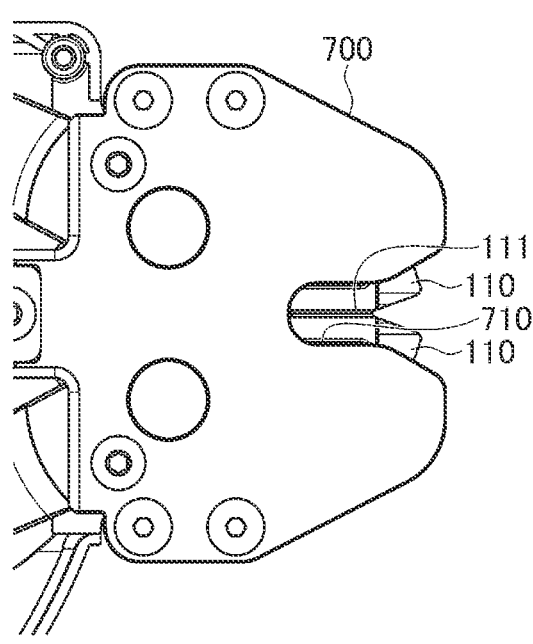
FIG. 2 is a diagram showing a configuration of a guide plate included in the cutting device according to the first illustrative embodiment.

In the present illustrative embodiment, a pair of guide plates 700 are provided near the blade members 110. The guide plates 700 are plate-shaped members made of metal, and are disposed to sandwich the blade members 110 from both the front side and the back side in FIG. 1 when viewed on paper. Shapes of the pair of guide plates 700 are substantially the same. As shown in FIG. 2, each guide plate 700 has a recess 710 formed therein.

For convenience of description, a right side in FIG. 1 will also be referred to as a "front end side" below, and a left side in FIG. 1 will be referred to as a "rear end side" below. The recess 710 is formed to recede from the front end side toward the rear end side of the guide plate 700. When the cutting device 10 is viewed from a side as shown in FIGS. 1 and 2, each recess 710 is formed at a position that includes the cutting blade 111 in the closed state. In a standby state where the cutting blades 111 are fully opened, the cutting blades 111 are retracted to the outside of the recesses 710, and from a perspective of FIG. 2, the entire blade members 110 are hidden by the guide plates 700. The guide plates 700 have both a function of covering and protecting the cutting blades 111 in the standby state, and a function of guiding the reinforcing bar, which is the object to be cut, along the recesses 710 between the pair of cutting blades 111. The guide plates 700 further have a function of stabilizing a posture of the cutting device 10 before and after cutting by sandwiching the reinforcing bar in the recesses 710.

The ball screw 200 is a device for converting a rotational movement of the electric motor 400 into a linear movement of the connection member 230, thereby causing the cutting mechanism 100 to operate. The ball screw 200 includes a screw shaft 210, a nut 220, and the connection member 230.

The screw shaft 210 is a rod-shaped member that extends linearly from the rear end side to the front end side. A male screw is formed on an outer peripheral surface of the screw shaft 210. When the electric motor 400 is driven, the screw shaft 210 rotates about a central axis thereof.

The nut 220 is a substantially cylindrical member disposed to surround the screw shaft 210 from an outer peripheral side. A female screw is formed on an inner peripheral surface of the nut 220, and is screwed to the male screw formed on the outer peripheral surface of the screw shaft 210. While the nut 220 is allowed to move along a longitudinal direction of the screw shaft 210, rotation about the central axis of the screw shaft 210 is restricted. Therefore, when the screw shaft 210 rotates about the central axis thereof, the nut 220 moves in the left-right direction in FIG. 1 along the central axis.

The connection member 230 is a member attached to the nut 220 and is a member that moves along the screw shaft 210 together with the nut 220. The connection member 230 is attached in a manner of protruding from the nut 220 toward the front end side. The pair of link members 120 are connected to a portion of the connection member 230 near an end on the front end side via the shaft 231 described above.

A magnet 241 is attached to the outer peripheral surface of the connection member 230. A Hall sensor 242 is attached to the housing 11 at a position near the connection member 230. The position where the Hall sensor 242 is attached is such that when the nut 220 moves to a rear end from the state shown in FIG. 1 and the cutting blades 111 are fully opened, the Hall sensor 242 faces the magnet 241 of the connection member 230. When the cutting blades 111 are fully opened, a signal is transmitted from the Hall sensor 242 by facing the magnet 241, and the signal is input to the control board 500.

The speed reducer 300 is configured to reduce a rotation speed of an output shaft 410 of the electric motor 400 and then transmit the rotation to the screw shaft 210 of the ball screw 200.

The electric motor 400 is a rotating electrical machine for generating a driving force necessary for operating the cutting blades 111, and is, for example, a brushless DC motor. The electric motor 400 has the output shaft 410. The output shaft 410 is a substantially cylindrical member, and a central axis thereof coincides with the central axis of the screw shaft 210. A part of the output shaft 410 protrudes toward the speed reducer 300 and is connected to the speed reducer 300.

When current is supplied to a coil of the electric motor 400, the output shaft 410 rotates about the central axis thereof. The rotation of the output shaft 410 is transmitted to the screw shaft 210 via the speed reducer 300, and causes the nut 220 to move toward the front end side or the rear end side. Accordingly, the cutting blades 111 of the cutting mechanism 100 are operated to open and close as described above.

A rotation sensor 420 is provided inside the electric motor 400. The rotation sensor 420 is configured to emit a pulse signal every time the output shaft 410 rotates by a predetermined angle. The rotation sensor 420 is provided on a board 430 included in the electric motor 400. The pulse signal from the rotation sensor 420 is transmitted to the control board 500. By counting the number of pulse signals, the control board 500 can know a rotation angle of the output shaft 410 after a specific timing. The control board 500 can also know the rotation speed of the output shaft 410 based on the number of pulse signals input per unit time. The rotation sensor 420 may be a different type of a sensor from that of the present illustrative embodiment, or may be a sensor separately provided at a position different from the electric motor 400 as long as the sensor can measure the rotation angle and the rotation speed of the output shaft 410. The rotation sensor 420 corresponds to a "speed sensor" in the present illustrative embodiment.

The control board 500 is a circuit board provided to control an overall operation of the cutting device 10 including the electric motor 400. The control board 500 includes an inverter circuit for adjusting the current supplied to the electric motor 400, a microcomputer for controlling a switching operation and the like in the inverter circuit, and the like.

The storage battery 600 stores electric power necessary for operating the electric motor 400 and the control board 500, and is, for example, a lithium ion battery. In the cutting device 10, a portion in which the storage battery 600 is built is detachable from the housing 11 as a battery pack, and is connected to and charged by an external charger. Instead of such an aspect, a configuration may be adopted in which the storage battery 600 can be charged while the storage battery 600 is attached to the housing 11.

A configuration of the control board 500 will be described with reference to FIG. 3. The control board 500 having the microcomputer includes a speed acquisition unit 510, a position acquisition unit 520, and a control unit 530 as elements representing functions of the control board 500.

The speed acquisition unit 510 is configured to perform processing of acquiring a speed index. The term "speed index" is an index indicating an operation speed when the cutting blades 111 are opened and closed. In the present illustrative embodiment, the speed acquisition unit 510 acquires the speed index based on a rotation speed of the electric motor 400 which is measured by the rotation sensor 420 (speed sensor). Specifically, the number of pulse signals input per unit time from the rotation sensor 420 is calculated and acquired by the speed acquisition unit 510 as the speed index. The speed index may indirectly indicate the operation speed of the cutting blades 111 as in the present illustrative embodiment, but may also be a value of the operation speed of the cutting blades 111. For example, when an angle between the pair of cutting blades 111 is set as θ, a change amount of θ per unit time may be used as the speed index.

The speed index may be acquired based on a measurement value of the rotation sensor 420 as described above, but may also be acquired based on other physical quantities. For example, the speed index may be acquired based on a value of the current supplied from the storage battery 600 to the electric motor 400, or the speed index may be acquired based on a voltage between terminals of the storage battery 600. In any case, a correspondence between a physical quantity of an object and the operation speed of the cutting blades 111 may be determined in advance through experiments or the like, and a calculation map of the speed index may be created in advance based on the correspondence. The calculation map may be stored in a storage device (for example, ROM, not shown) provided in the control board 500, for example. The above correspondence may be expressed as a mathematical expression instead of the map.

The position acquisition unit 520 is configured to perform processing of acquiring a position index. The term "position index" is an index indicating a current position of the cutting blades 111. In the present illustrative embodiment, a count value of the pulse signal input from the rotation sensor 420 is calculated and acquired by the position acquisition unit 520 as the position index, based on a time when the magnet 241 and the Hall sensor 242 face each other. The position index may indirectly indicate the current position of the cutting blades 111 as in the present illustrative embodiment, but may also be a value of the current position of the cutting blades 111. For example, when the angle between the pair of cutting blades 111 is set as θ, a value of θ may be used as the current position.

In order to enable acquisition of the position index, a reset operation may be performed when the cutting device 10 is started up. In the reset operation, for example, the electric motor 400 may be driven in a direction where the pair of cutting blades 111 change from the closed state to the opened state, and the electric motor 400 may be stopped at a time point when a detection signal from the Hall sensor 242 is input. By starting counting the pulse signals from this time point, the subsequent position index of the cutting blades 111 can be accurately acquired.

The control unit 530 is configured to control the operation of the electric motor 400. The control unit 530 is configured to control an opening and closing operation of the cutting blades 111 by adjusting magnitude of the current supplied to the electric motor 400, for example, by PWM control. The control unit 530 is also configured to control a braking operation of the cutting blades 111 by performing a so-called "short braking" that short-circuits some of a plurality of coils included in the electric motor 400 periodically or continuously.

An overview of processing executed by the control board 500 will be described with reference to FIG. 4. When cutting the reinforcing bar, the pair of cutting blades 111 move from a fully opened position to a fully closed position. Finally, the cutting blades 111 are stopped by braking performed by the control unit 530. In FIG. 4A, FIG. 4B, and FIG. 4C, states where the current position of the cutting blades 111 is changing between the "fully opened position" on the left side and the "fully closed position" on the right side are schematically depicted. An arrow AR1 shown in each of FIG. 4A, FIG. 4B, and FIG. 4C represents magnitude of a distance that the cutting blades 111 are predicted to move in a period until the braking is completed when the braking is started at the current time point.

A position corresponding to a front end of the arrow AR1 represents a position where the braking is completed and the cutting blades are expected to stop. This position will be referred to as a "predicted position" below. If the braking is started at a time point shown in FIG. 4A, the predicted position is on a front side of the fully closed position. When a target position where the cutting blades 111 are to be stopped is set as the fully closed position, the braking may be started at a timing shown in FIG. 4B in which the current position of the cutting blades 111 is advanced beyond that shown in FIG. 4A.

However, a length of the arrow AR1, that is, a braking distance of the cutting blades 111 is not always constant, but changes depending on the operation speed of the cutting blade 111. For example, when the braking is started while the cutting blades 111 are operating at a high speed, the braking distance becomes longer. In an example of FIG. 4C, as a result of the braking distance being longer as described above, even though the braking is started at the same timing as in FIG. 4A, the cutting blades 111 are stopped at the fully closed position which is the target position.

It can be seen from the above that it is possible to stop the cutting blades 111 at the target position by repeatedly calculating the predicted position and starting the braking at the timing when the predicted position coincides with the target position. Therefore, in parallel with causing the cutting blades 111 to perform the cutting operation, the control board 500 according to the present illustrative embodiment measures an appropriate braking start timing to stop the cutting blades 111 at the target position while repeatedly calculating a length of the arrow AR1 (braking distance index described later).

Figure 5:
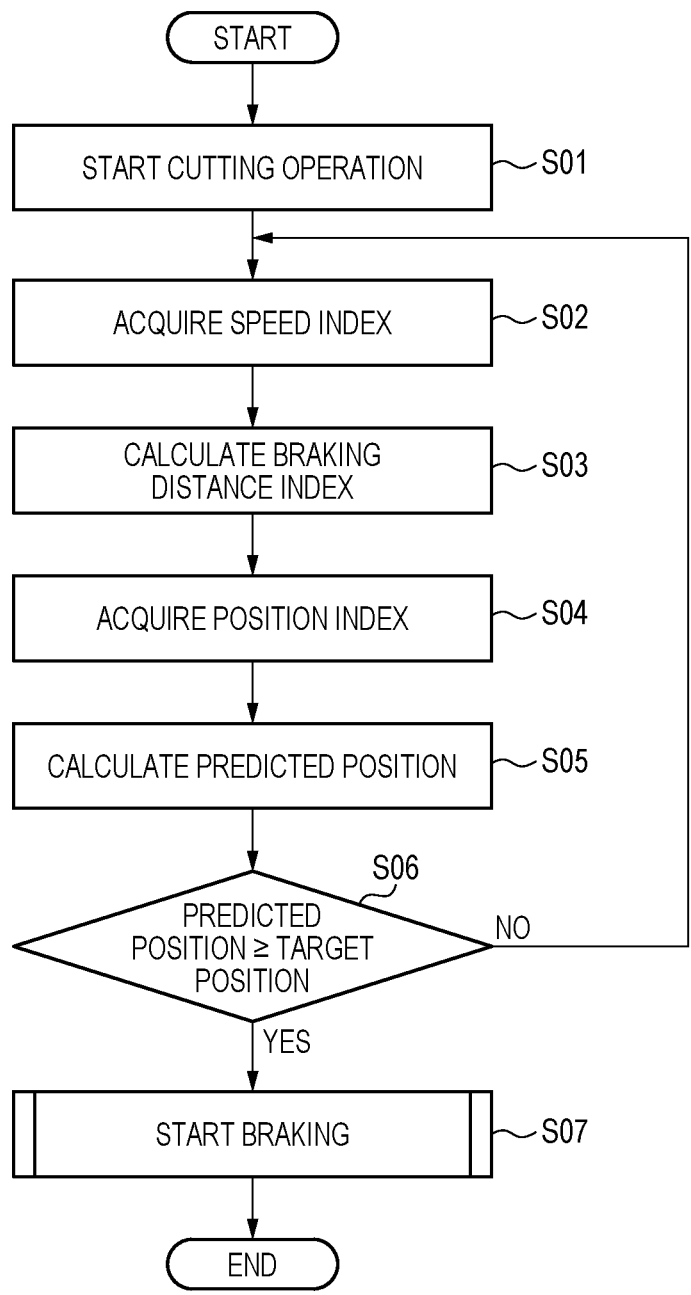
FIG. 5 is a flowchart showing a flow of processing executed by the control board according to the first illustrative embodiment.

A specific flow of processing executed by the control board 500 will be described with reference to FIG. 5. A series of the processing shown in FIG. 5 is started at a timing when the trigger switch 12 is turned on by the user.

In a first step S01 of the processing, the cutting operation of the cutting blades 111 is started. After this, the pair of cutting blades 111 move toward each other. Immediately after the cutting blades 111 start to move, the cutting blades 111 come into contact with the reinforcing bar (not shown), and as the cutting blades 111 move further, the reinforcing bar is plastically deformed.

In step S02 following step S01, the speed acquisition unit 510 performs the processing of acquiring the speed index. In step S03 following step S02, the control unit 530 performs processing of calculating the braking distance index. The term "braking distance index" is an index indicating a distance that the cutting blades 111 are predicted to move from the start of braking the cutting blades 111 until the stop of the cutting blades 111 while the cutting blades 111 are in operation. In the present illustrative embodiment, the number of pulse signals (count value) predicted to be input from the rotation sensor 420 from the start of braking until the stop of the cutting blades 111 is used as the braking distance index. The braking distance index may indirectly indicate the braking distance of the cutting blades 111 as in the present illustrative embodiment, but may also be a value of the braking distance itself. For example, when the angle between the pair of cutting blades 111 is set as $\theta$, a predicted value of the change amount of $\theta$ during the period from the start to the end of the braking may be used as the braking distance index.

As described above, the braking distance of the cutting blades 111 changes depending on the operation speed of the cutting blades 111. Therefore, there is a certain correlation between the speed index and the braking distance index. Therefore, the control unit 530 calculates the braking distance index based on the speed index.

Figure 6:
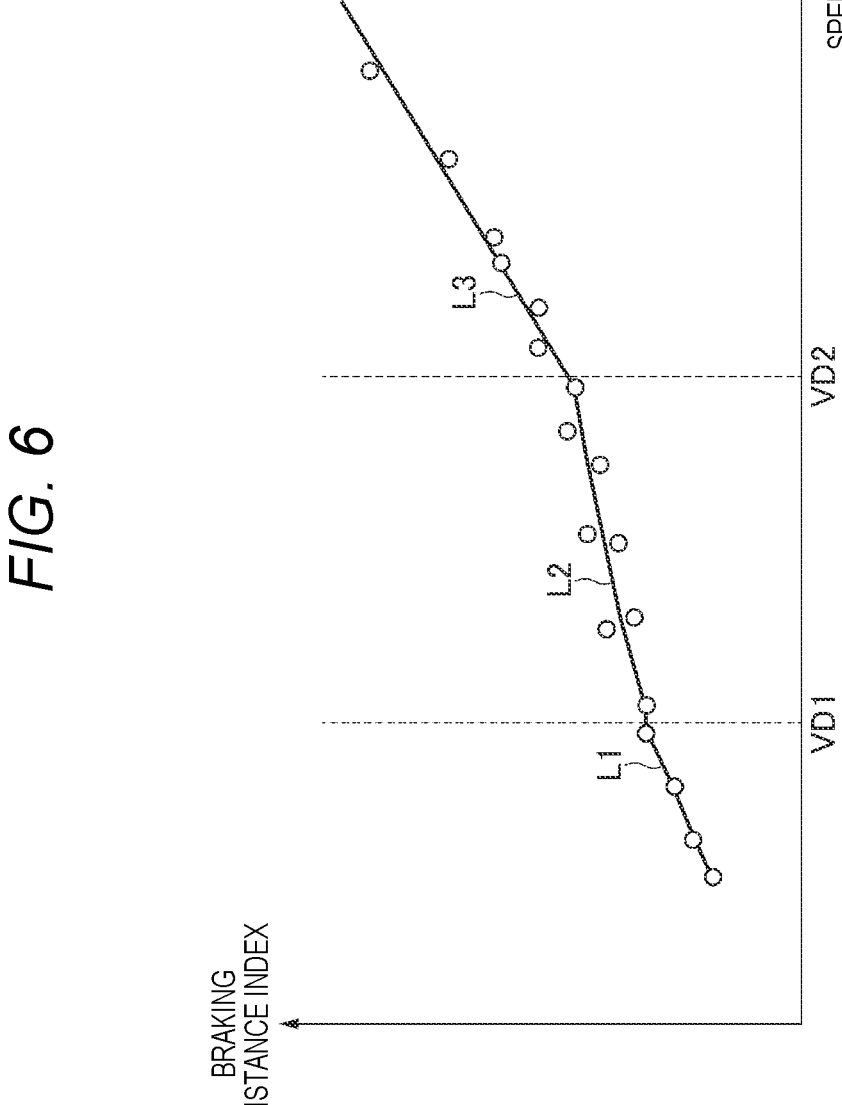
FIG. 6 is a diagram illustrating a method of calculating a braking distance index.

FIG. 6 shows an example of a correspondence between the speed index and the braking distance index. Each plot represents an actual measurement value. As shown in FIG. 6, the larger the speed index (that is, the faster the operation speed of the cutting blade 111 during the cutting operation), the larger the calculated braking distance index tends to be. In the example of FIG. 6, in a region where the speed index is smaller than VD1, a correlation between the speed index and the braking distance index is approximated by a straight line L1. Similarly, in a region where the speed index is larger than or equal to VD1 and smaller than VD2, the correlation between the speed index and the braking distance index is approximated by a straight line L2, and in a region where the speed index is equal to or larger than VD2, the correlation between the speed index and the braking distance index is approximated by a straight line L3. Each approximate straight line can be calculated by using, for example, a least squares method.

Such a correspondence between the speed index and the braking distance index is measured and calculated in advance through experiments and the like, and then stored as a map in a storage device (for example, a read only memory (ROM), not shown) provided in the control board 500. The control unit 530 calculates the braking distance index in step S03 based on the correspondence stored in advance in this way and the speed index acquired in step S02 in FIG. 5.

In step S04 following step S03, the position acquisition unit 520 performs the processing of acquiring the position index. In step S05 following step S04, for example, the control unit 530 performs processing of calculating the predicted position. This predicted position is the position at the front end of the arrow AR1 in each of FIG. 4A, FIG. 4B, and FIG. 4C, and is a position acquired by adding a moving distance of the cutting blades 111 corresponding to the braking distance index to the current position of the cutting blades 111 corresponding to the position index. In step S05, such a predicted position is calculated as a value converted into an index of the same type as the position index. Specifically, a value acquired by simply adding the braking distance index to the position index is directly calculated as the predicted position.

The term "add" in the above means that the current position of the cutting blades 111 corresponding to the position index is changed by the moving distance of the cutting blades 111 corresponding to the braking distance index in a direction of movement of the cutting blade 111.

In step S06 following step S05, it is determined by the control board 500, for example, whether the predicted position calculated in step S05 is further than or equal to the preset target position. The target position represents, as an index of the same type as the position index, a position of the cutting blades 111 to be reached at an end time point of the cutting operation. The target position is set, for example, to a position where the pair of cutting blades 111 are in the closed state. The term "position where . . . in the closed state" is, for example, a position where the pair of cutting blades 111 are in contact with each other, that is, the fully closed position. The position of the cutting blade 111 that is just before fully closing may be set as the target position. In addition, the predicted position in the above "is further than or equal to the target position" means that the predicted position coincides with the target position or is calculated as a position closer to the fully closed side than the target position.

Figures 4A, 4B, 4C:
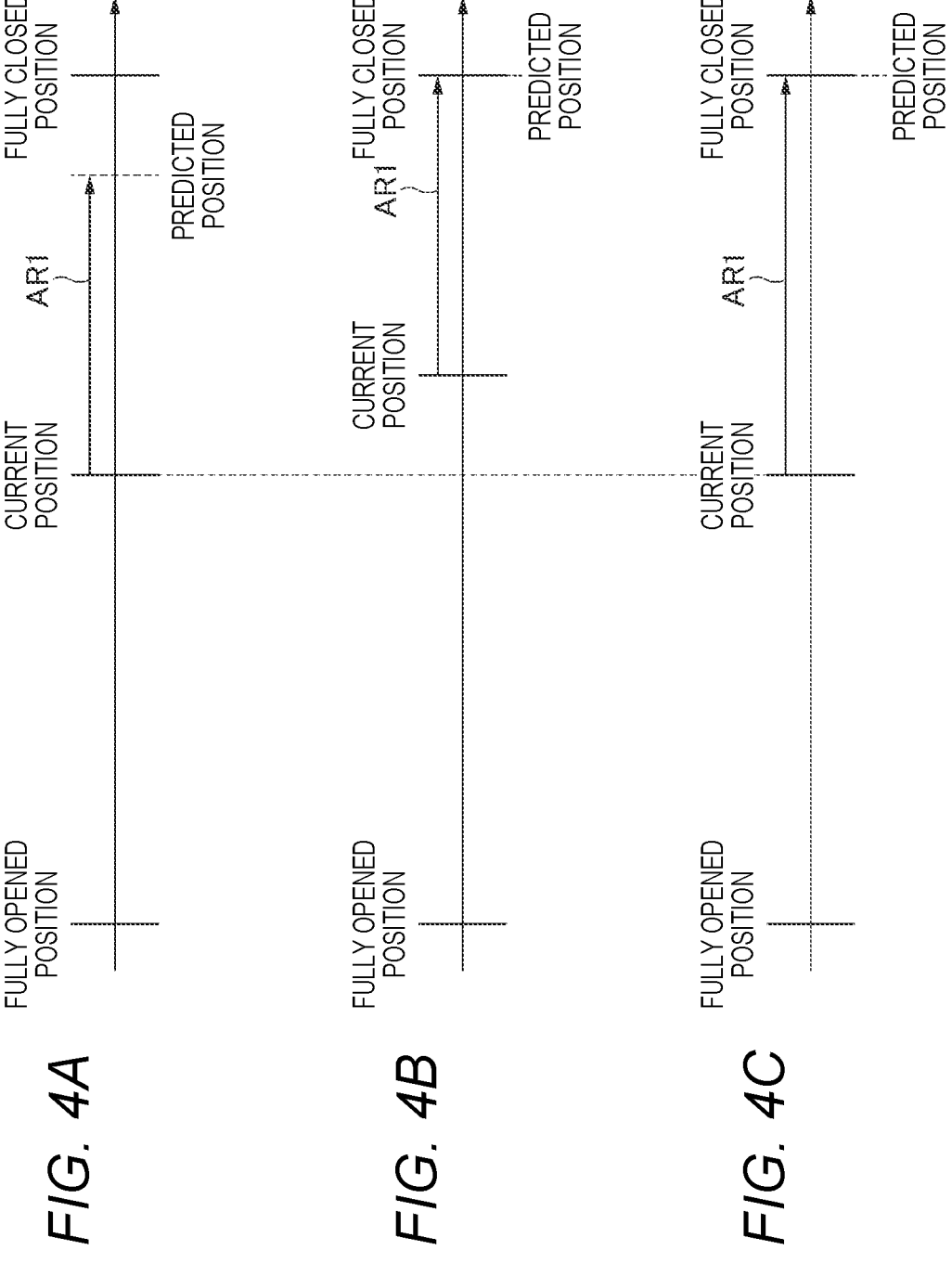
FIG. 4A, FIG. 4B, and FIG. 4C are diagrams illustrating operations of the cutting device according to the first illustrative embodiment during braking.

When the predicted position does not reach the target position, if the braking is started at the current time point, the cutting blades 111 are stopped on the front side of the target position, as in the example of FIG. 4A. Therefore, in this case, the processing in and after step S02 is executed again while the operation of the cutting blades 111 is continued.

If it is determined that the predicted position is further than or equal to the target position, the determination means that the appropriate timing comes to start braking. Therefore, in this case, the processing proceeds to step S07, and the control unit 530 starts braking the cutting blades 111. After that, the operation speed of the cutting blades 111 gradually decreases. In many cases, the reinforcing bar breaks before the cutting blades 111 reaches the target position.

Figure 7:
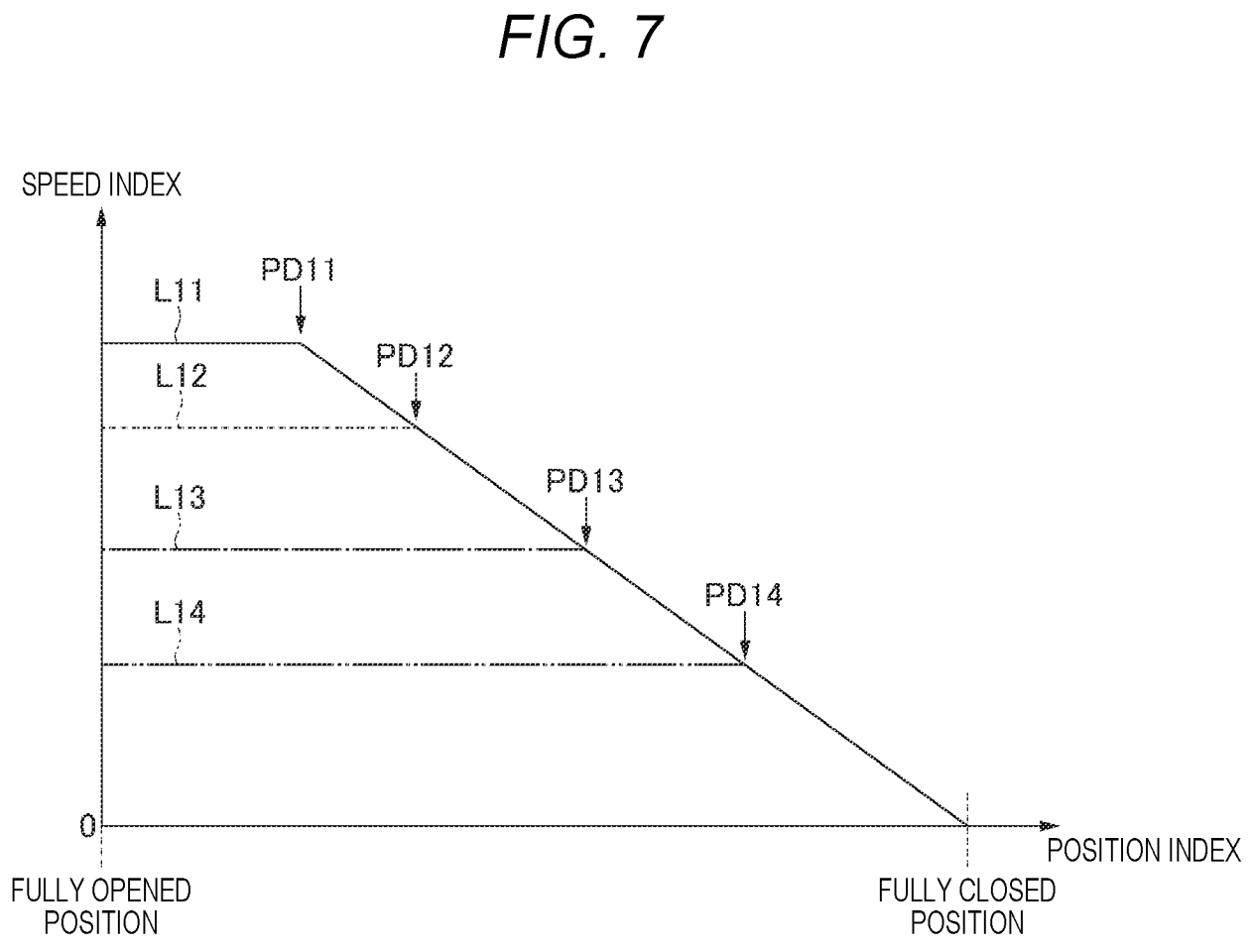

FIG. 7 shows an example of changes in the speed index. A line L11 in FIG. 7 is an example of a case where the braking is started from a state where the speed index is large. "PD11" represents the position of the cutting blades 111 at the timing when the braking is started, that is, at the timing when the determination is made Yes in step S06 in FIG. 5. After the timing of PD11, the speed index gradually decreases due to the braking, and the cutting blades 111 are stopped at a time point when the cutting blades 111 reach the fully closed position which is the target position.

A line L12 is an example of a case where the braking is started from a state where the speed index is smaller than the line L11. "PD12" represents the position of the cutting blades 111 at the timing when the braking is started in this example. In the example of the line L12, the braking distance index is calculated as a smaller value than in the example of the line L11, and thus, the timing of starting braking is slightly delayed. However, after the timing of PD12, the speed index gradually decreases similarly to the line L12, and the cutting blades 111 are stopped at a time point when the cutting blades 111 reach the fully closed position. A line L13 and a line L14 are the same as above, and as the speed index before braking becomes smaller, the timing of starting braking (PD13, PD14) becomes later, and the cutting blades 111 are stopped at the target position. This is because in any case, the braking distance index is calculated based on the speed index, and as a result, the timing of starting braking is set appropriately.

As described above, the control unit 530 according to the present illustrative embodiment is configured to determine the timing to start braking the cutting blades 111 based on the position index and the braking distance index. Specifically, the control unit 530 determines the timing to start braking the cutting blades 111 as the timing when the predicted position becomes the predetermined target position, the predicted position calculated by adding the moving distance of the cutting blades 111 corresponding to the braking distance index to the current position of the cutting blades 111 corresponding to the position index. As a result, even if the braking distance varies depending on, for example, a material or shape of the reinforcing bar, the braking can be started at the corresponding timing and the cutting blades can always be stopped at an appropriate position. Since the cutting blades can always be stopped at an appropriate position, a risk of collision between the cutting blades can be reduced. As a result, it is possible to drive at high speed, and thus, a cutting time can be shortened.

As a control for stopping the cutting blades 111 at an appropriate position, in addition to performing a control to adjust a braking start timing as in the present illustrative embodiment, it is also conceivable to perform a control to adjust strength of the braking. However, in the latter control, if a strong braking force is required, it is necessary to increase current for the braking which flows through the electric motor 400, and thus, a large amount of heat is generated in the electric motor 400. At a construction site and the like, the cutting device 10 is often operated continuously. Therefore, when the control is performed to adjust the strength of the braking as described above, a temperature of the electric motor 400 may rise too much. In particular, since the cutting device 10 is required to have a high cutting speed, excessive temperature rise of the electric motor 400 due to continuous use is undesirable. In this regard, in the cutting device 10 according to the present illustrative embodiment, the braking start timing is adjusted instead of the strength of the braking, and thus, the cutting blades can be stopped at the appropriate position while reducing heat generated in the electric motor 400.

By the way, depending on the shape and the like of the reinforcing bar, a resistance that the cutting blades 111 receives becomes larger before the reinforcing bar breaks, and the operation speed of the cutting blades 111 may decrease too much. In such a state, a too long time may be taken for the reinforcing bar to break, or the cutting blades 111 may be stopped before the reinforcing bar breaks.

Figure 8:
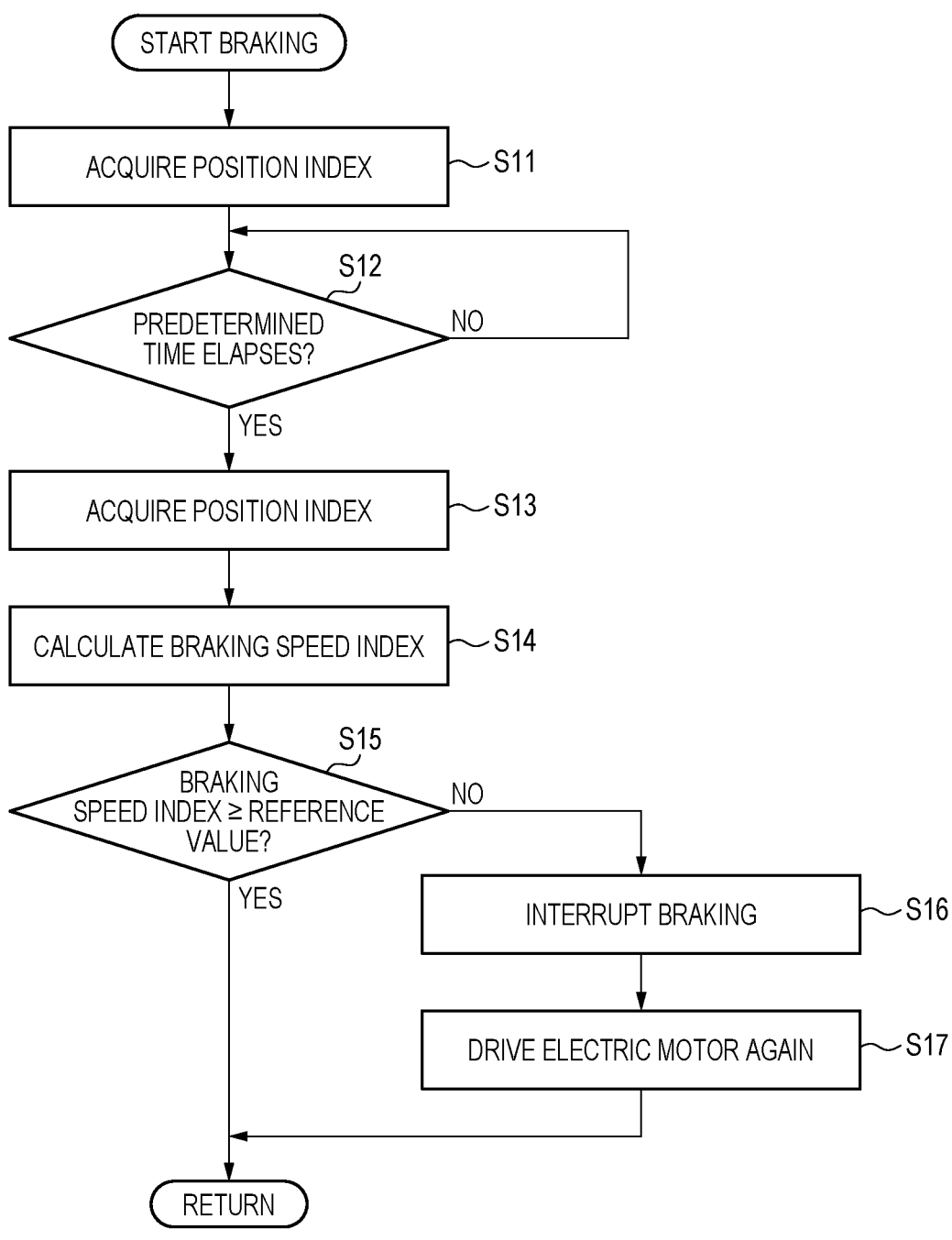
FIG. 8 is a flowchart showing a flow of processing executed by the control board.

Therefore, the control board 500 according to the present illustrative embodiment prevents such a situation from occurring by executing processing shown in FIG. 8. A flowchart shown in FIG. 8 represents a flow of processing executed by the control board 500 after moving to step S07 in FIG. 5 and starting braking.

In the first step S11, similarly to step S04 in FIG. 5, the position acquisition unit 520 performs the processing of acquiring the position index. In step S12 following step S11, it is determined by the control board 500, for example, whether a predetermined period from the timing when the braking is started in step S07 to the current time point elapses. If the predetermined period does not elapse, the processing of step S12 is executed again and the control board 500 waits. If the predetermined time elapses, the processing proceeds to step S13.

In step S13, the position acquisition unit 520 performs the processing of acquiring the position index again. In step S14 following step S13, for example, the control unit 530 performs processing of calculating a braking speed index. The term "braking speed index" is an index indicating the operation speed of the cutting blades 111 after the braking of the cutting blades 111 is started when the reinforcing bar is being cut. In the present illustrative embodiment, a change amount of the position index before and after the above "predetermined period" elapses is calculated as the braking speed index. That is, a value acquired by subtracting the position index acquired in step S13 from the position index acquired in step S11 is calculated as the braking speed index.

The braking speed index may be calculated as a value different from the above, as long as the value indicates the operation speed of the cutting blades 111 after the braking of the cutting blade 111 is started. For example, a reciprocal of a length of the period required for the rotation speed of the electric motor 400 to decrease to a predetermined value after the braking is started may be used as the braking speed index.

In step S15 following step S14, it is determined by the control board 500, for example, whether the braking speed index calculated as described above is larger than or equal to a predetermined reference value. If the braking speed index is larger than or equal to the reference value, it is determined that the operation for cutting is being performed normally, and the processing shown in FIG. 8 ends. If the braking speed index is smaller than the reference value, the processing proceeds to step S16.

The description that the processing proceeds to step S16 means that the operation speed of the cutting blades 111 decreases too much for some reason. Therefore, in step S16, the control unit 530 interrupts processing for braking. Specifically, the short braking processing described above is interrupted.

In step S17 following step S16, the control unit 530 drives the electric motor 400 again. After that, the electric motor 400 is operated in a direction where the cutting blades 111 move toward the target position while maintaining a normal state where the braking is not performed. By operating the cutting blades 111 again using the driving force of the electric motor 400, the reinforcing bar can be immediately cut.

Figure 9A:
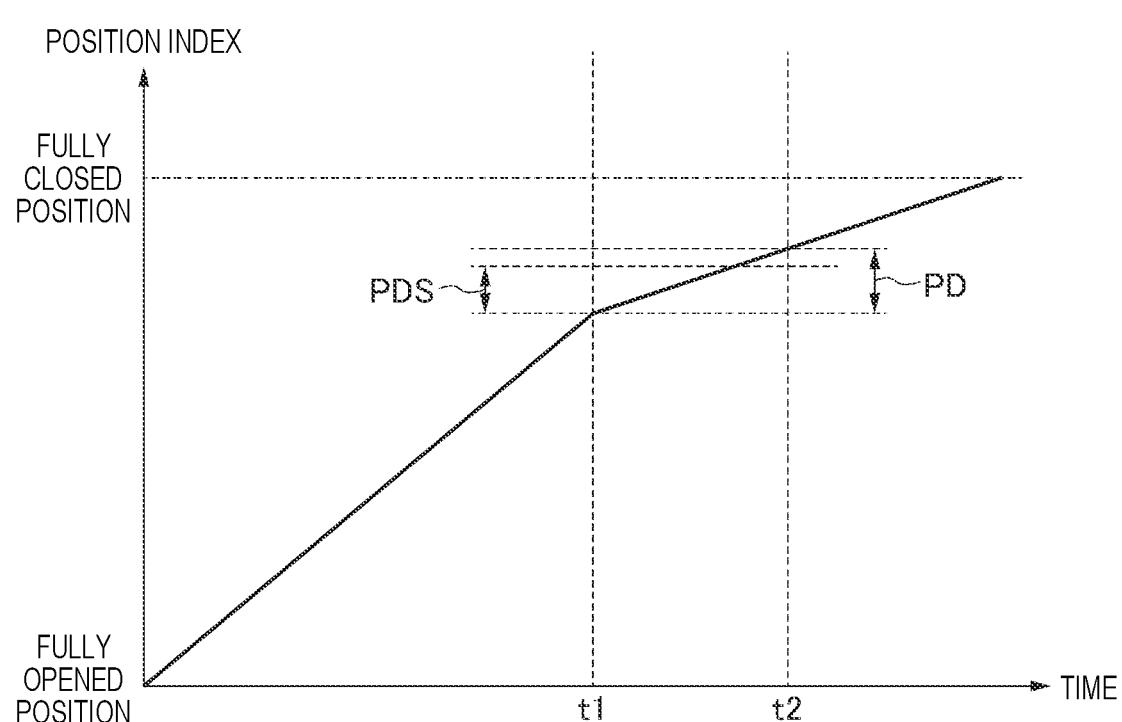
FIG. 9A and FIG. 9B are diagrams illustrating processing performed during braking.
Figure 9B:
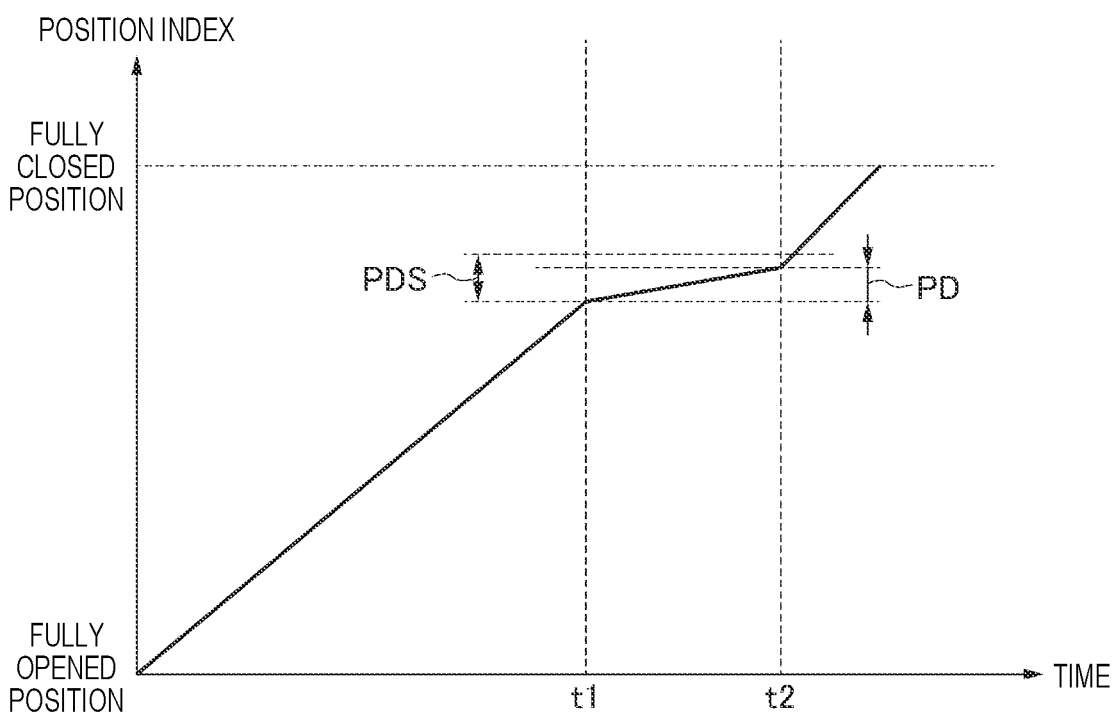

Each of FIG. 9A and FIG. 9B shows an example of a temporal change of the position index during the cutting operation. In the example of FIG. 9A, the cutting blades 111 are moving at a substantially constant speed from the fully opened position to the fully closed position during the period up to a time t1 when the braking is started. After the braking is started at the time t1, the cutting blades 111 continue to move toward the fully closed position while reducing the speed due to the braking. In FIG. 9A, the change in the position index after the time t1 is simply depicted as being linear, but an actual change is different from this. The same applies to FIG. 9B described later.

A time t2 shown in FIG. 9A is a time when a predetermined period from the time t1 elapses. "PDS" in FIG. 9A is a "reference value" used for the determination in step S15 in FIG. 8. In the example of FIG. 9A, a change amount PD of the position index (that is, the braking speed index) during the predetermined period from the time t1 to the time t2 is larger than the reference value PDS. Therefore, in this case, the determination in step S15 in FIG. 8 is made Yes, and the braking is continued.

In this regard, in the example shown in FIG. 9B, the change amount PD of the position index during the predetermined period from the time t1 to the time t2 is smaller than the reference value PDS. Therefore, in this case, the determination in step S15 in FIG. 8 is made No, and the braking is interrupted.

In this way, when the reinforcing bar which is the object to be cut is cut, if the braking speed index, which is an index indicating the operation speed of the cutting blades 111 after the braking of the cutting blades 111 is started, is smaller than the predetermined reference value PDS, the control unit 530 interrupts the braking of the cutting blades 111 and continues the operation for cutting. Accordingly, even if the reinforcing bar becomes difficult to break during the braking for some reason, the situation can be quickly resolved.

Figure 10:
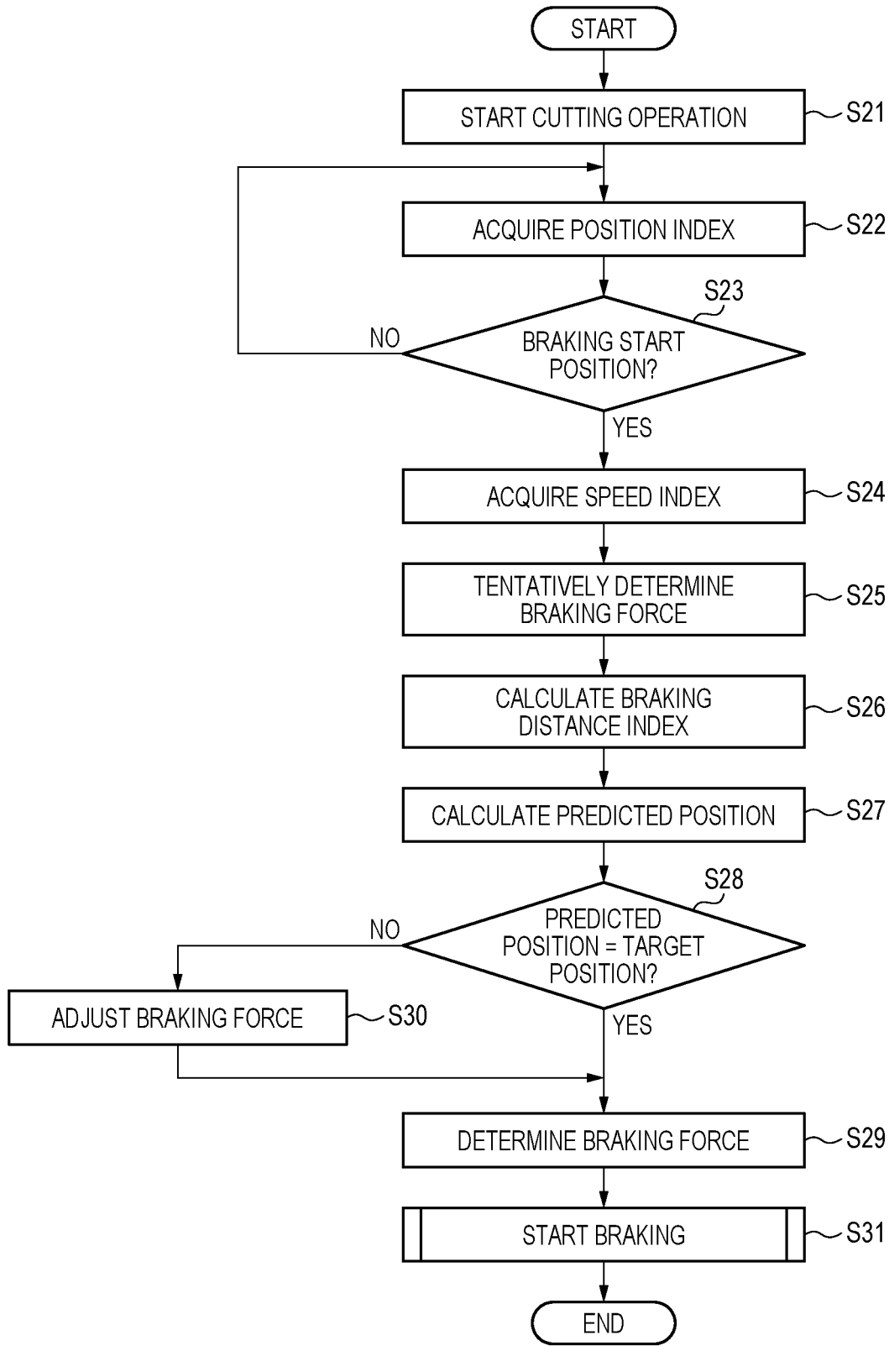
FIG. 10 is a flowchart showing a flow of processing executed by a control board according to a second illustrative embodiment.

A second illustrative embodiment is described. In the following, points different from the first illustrative embodiment will be mainly described, and descriptions of points common to those of the first illustrative embodiment will be omitted as appropriate. The present illustrative embodiment differs from the first illustrative embodiment in contents of the processing executed by the control board 500. A series of processing shown in FIG. 10 is executed by the control board 500 according to the present illustrative embodiment instead of the series of the processing shown in FIG. 5.

In the first step S21, the cutting operation of the cutting blades 111 is started similarly to step S01 in FIG. 5. After this, the pair of cutting blades 111 move toward each other.

In step S22 following step S21, the position acquisition unit 520 performs the processing of acquiring the position index, similar to step S04 in FIG. 5. In step S23 following step S22, it is determined by the control board 500, for example, whether the position index acquired in step S22 becomes a value corresponding to a predetermined braking start position. The term "braking start position" is a preset position of the cutting blades 111 where the braking is to be started. In the present illustrative embodiment, the braking start position is set as a fixed position that does not vary depending on the speed of the cutting blades 111. If the current position of the cutting blades 111 does not reach the braking start position, the processing in and after step S22 is executed again while the operation of the cutting blades 111 continues. If the current position of the cutting blades 111 reaches the braking start position, the processing proceeds from step S23 to step S24. In step S24, the speed acquisition unit 510 performs the processing of acquiring the speed index, similar to step S02 in FIG. 5.

In step S25 following step S24, the control unit 530 performs processing of tentatively determining a braking force. In the present illustrative embodiment, a value of a duty of the short braking, specifically, a value indicating a ratio of a period during which some of the coils included in the electric motor 400 are short-circuited, is used as a parameter indicating the braking force. The braking force tentatively determined in step S25 may always be the same fixed value, or may be set each time according to the value of the speed index acquired in step S24.

In step S26 following step S25, the control unit 530 performs the processing of calculating the braking distance index, similar to step S03 in FIG. 5. If the braking force tentatively determined in step S25 is set each time according to the value of the speed index and the like, the method of calculating the braking distance index in step S26 may be changed as appropriate depending on a set value of the braking force.

In step S27 following step S26, the control unit 530 performs the processing of calculating the predicted position, similar to step S05 in FIG. 5. In the present illustrative embodiment, the value acquired by adding the braking distance index to the position index corresponding to the braking start position, which is the fixed value, is directly calculated as the predicted position. The predicted position calculated in this way varies depending on the operation speed of the cutting blades 111.

In step S28 following step S27, it is determined by the control board 500, for example, whether the predicted position calculated in step S27 coincides with the preset target position. In the present illustrative embodiment, the value of the position index corresponding to the position where the pair of cutting blades 111 are in contact with each other, that is, the fully closed position, is set as the target position. If an absolute value of a difference between the predicted position and the target position is so small as to be less than a preset threshold, it is determined that the predicted position coincides with the target position.

If the predicted position coincides with the target position, the processing proceeds to step S29. In step S29, the value of the braking force tentatively determined in step S25 is determined as a final braking force by the control board 500, for example. In step S31 following step S29, the control unit 530 starts braking the cutting blade 111. The control unit 530 performs the short braking processing such that the braking force determined in step S29 is generated. After that, the operation speed of the cutting blades 111 gradually decreases. In many cases, the reinforcing bar breaks before the cutting blades 111 reaches the target position.

If the predicted position does not coincide with the target position in step S28, the processing proceeds to step S30. In step S30, processing of adjusting the braking force, which is the tentatively determined value, is performed by the control board 500, for example. For example, if the predicted position is ahead of the target position (that is, if the cutting blade 111 moves too far in a closed direction), the braking force is adjusted to be stronger than before. Conversely, if the predicted position is before the target position (that is, if the cutting blades 111 are stopped before being completely closed), the braking force is adjusted to be weaker than before. In step S30, the braking force is adjusted such that the position of the cutting blades 111 at the time point when the braking is completed coincides with the target position. It is preferable that the correspondence between an adjustment amount of the braking force and the difference between the predicted position and the target position is measured in advance and stored, for example, as a map.

After the processing of step S30 is performed, the processing in and after step S29 is executed, and the cutting blades 111 are braked. In the present illustrative embodiment, the braking force is adjusted in step S30 as necessary, and thus, the cutting blades 111 always stop at the target position.

Figure 11:
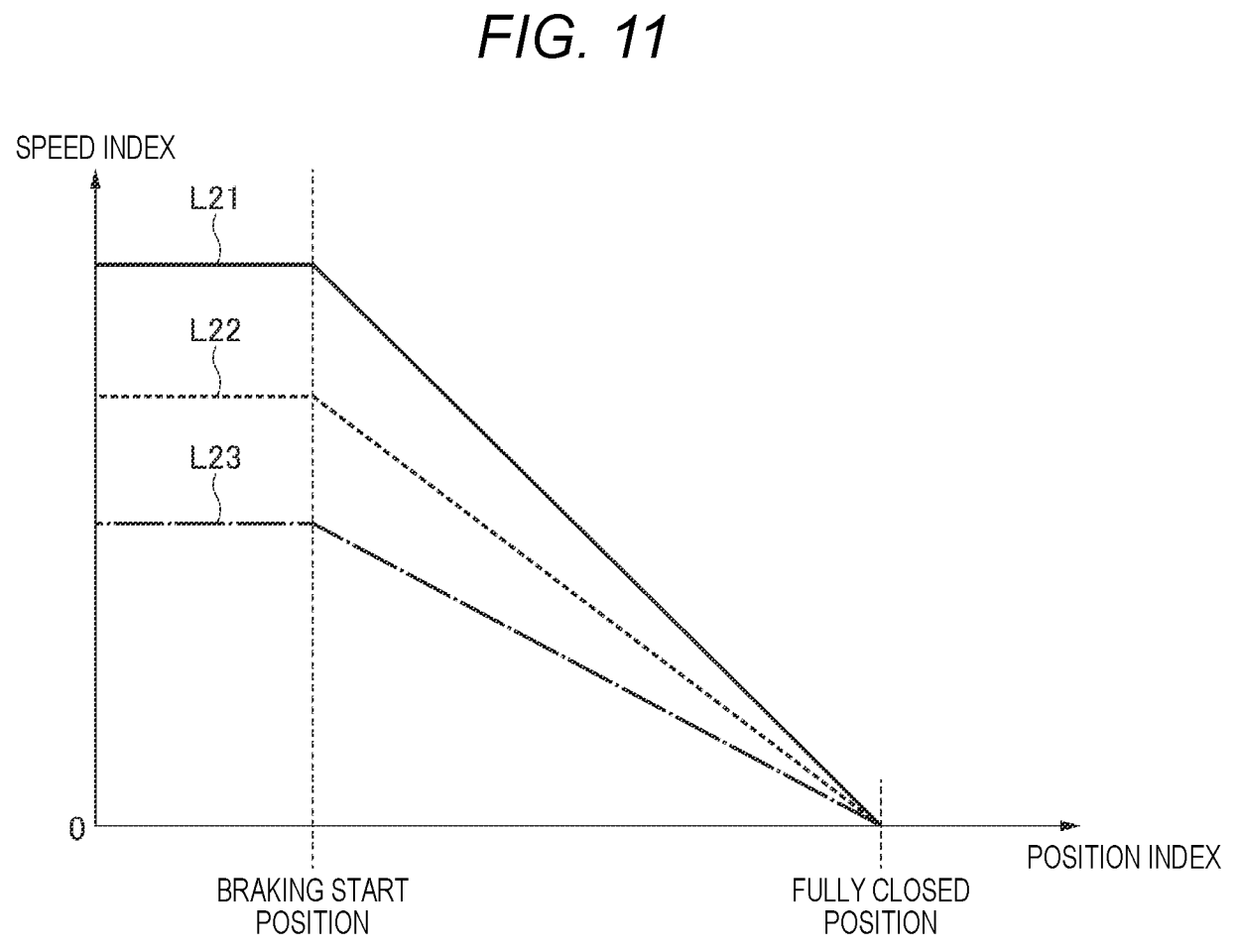

FIG. 11 shows an example of a relationship between the position index (horizontal axis) and the speed index (vertical axis) when the braking is performed. A line L21 is an example of a case where the braking is started from a state where the speed index is large. A line L22 is an example of a case where the braking is started from a state where the speed index is smaller than the line L21. A line L23 is an example of a case where the braking is started from a state where the speed index is further smaller than the line L22.

In any example, the braking is started at a time point when the current position of the cutting blades 111 reaches the braking start position. However, the braking force is adjusted as described above according to the speed index. As the speed index immediately before the start of the braking becomes smaller, the braking force is set to a smaller value, and thus, slopes in the graph of FIG. 11 become smaller. As a result of adjusting the braking force, in any example, the cutting blades 111 are stopped at a time point when the position index reaches a value corresponding to the target position (in the present example, the fully closed position).

In this way, the control unit 530 according to the present illustrative embodiment determines the braking force necessary for braking the cutting blades 111 based on the speed index. Specifically, the braking force of the cutting blades 111 is determined such that the predicted position becomes the predetermined target position, the predicted position calculated by adding the moving distance of the cutting blades 111 corresponding to the braking distance index to the predetermined braking start position. Accordingly, it becomes possible to stop the cutting blades 111 at the target position regardless of the operation speed of the cutting blades 111.

The present illustrative embodiment has been described above with reference to specific examples. However, the present disclosure is not limited to these specific examples. Design changes made by those skilled in the art as appropriate to these specific examples are also included within the scope of the present disclosure as long as the changes have characteristics of the present disclosure. Elements included in each of the specific examples described above, and arrangement, conditions, shapes, and the like of the elements are not limited to those illustrated, and can be changed as appropriate. The elements included in each of the specific examples described above can be appropriately combined as long as no technical contradiction occurs.

What is claimed is:

1. An electric cutting device, comprising:
   a pair of cutting blades configured to clamp and cut an object by moving from an opened state in which the cutting blades are spaced apart from each other to a closed state in which the cutting blades are in contact with or close to each other;
   an electric motor configured to generate a driving force necessary for operating the cutting blades;
   a controller configured to control an operation of the electric motor; and
   a speed detector configured to detect a speed index, the speed index indicating an operation speed of the cutting blades,
   wherein the controller is configured to:
      brake the cutting blades, when moving from the opened state to the closed state, based on the speed index.

2. The cutting device according to claim 1, wherein the controller is configured to:
   determine a timing to start braking the cutting blades based on the speed index.

3. The cutting device according to claim 2, further comprising:
   a position detector configured to detect a position index, the position index indicating a current position of the cutting blades,
   wherein the controller is configured to:
      calculate a braking distance index based on the speed index, the braking distance index indicating a distance that the cutting blades move from start of braking the cutting blades until stop of the cutting blades while the cutting blades are in operation; and
      determine the timing to start braking the cutting blades based on the position index and the braking distance index.

4. The cutting device according to claim 3, wherein the controller is configured to:
   determine the timing to start braking the cutting blades as a timing when a predicted position reaches a predetermined target position, the predicted position being calculated by adding a moving distance of the cutting blades corresponding to the braking distance index to the current position of the cutting blades corresponding to the position index.

5. The cutting device according to claim 4, wherein the target position is a position where the pair of cutting blades are in a closed state.

6. An electric cutting device comprising:
   a pair of cutting blades configured to clamp and cut an object;
   an electric motor configured to generate a driving force necessary for operating the cutting blades;
   a controller configured to control an operation of the electric motor; and a speed detector configured to detect a speed index, the speed index indicating an operation speed of the cutting blades, wherein the controller is configured to:

brake the cutting blades based on the speed index; and determine a braking force necessary for braking the cutting blades based on the speed index.

7. The cutting device according to claim 6, further comprising:

a position detector configured to detect a position index, the position index indicating a current position of the cutting blades, wherein the controller is configured to:

calculate a braking distance index based on the speed index, the braking distance index indicating a distance that the cutting blades move from start of braking the cutting blades until stop of the cutting blades while the cutting blades are in operation; and determine the braking force based on the position index and the braking distance index.

8. The cutting device according to claim 7, wherein the controller is configured to:

determine the braking force of the cutting blades such that a predicted position reaches a predetermined target position, the predicted position being calculated by adding a moving distance of the cutting blades corresponding to the braking distance index to a predetermined braking start position.

9. The cutting device according to claim 8, wherein the target position is a position where the pair of cutting blades come into contact with each other and are in a closed state.

10. The cutting device according to claim 2, further comprising:

a speed sensor configured to detect a rotation speed of the electric motor, wherein the speed detector detects the speed index based on the rotation speed.

11. The cutting device according to claim 6, further comprising:

a speed sensor configured to detect a rotation speed of the electric motor, wherein the speed detector detects the speed index based on the rotation speed.

12. The cutting device according to claim 1, wherein the controller is configured to control a breaking operation of the cutting blades by performing a short braking, the short braking comprising short-circuiting some of a plurality of coils included in the electric motor periodically or continuously.

13. The cutting device according to claim 12, wherein the controller is configured to:

determine a braking force necessary for braking the cutting blades based on the speed index; and perform the short braking to generate the determined braking force so as to gradually decrease the operation speed of the cutting blades.

14. An electric cutting device comprising:

a pair of cutting blades configured to clamp and cut an object;

an electric motor configured to generate a driving force necessary for operating the cutting blades;

a controller configured to control an operation of the electric motor; and a speed detector configured to detect a speed index, the speed index indicating an operation speed of the cutting blades, wherein the controller is configured to:

brake the cutting blades based on the speed index, and wherein when the object is cut, the controller is configured to:

in a case where a braking speed index is smaller than a predetermined reference value, the speed index indicating the operation speed of the cutting blades after starting braking the cutting blades, interrupt the braking of the cutting blades and continue an operation for cutting.

* * * * *